No. 874,642.
PATENTED DEC. 24, 1907.
H. A. THOMPSON.
NUT LOCK.
APPLICATION FILED JUNE 3, 1907.
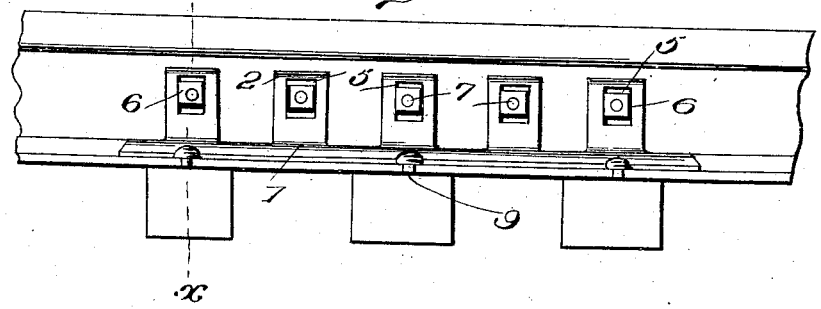
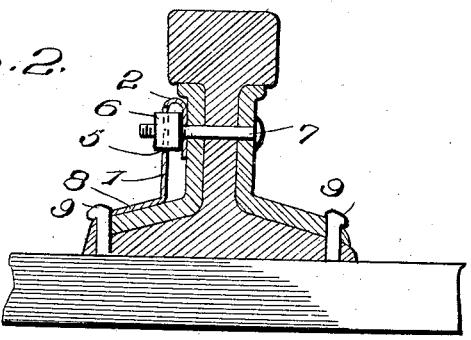
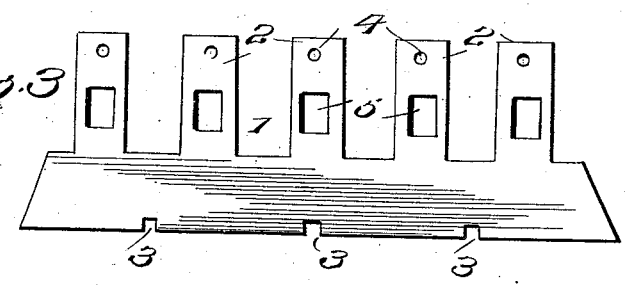
Witnesses
Inventor
H. A. Thompson
By
Attorneys

UNITED STATES PATENT OFFICE.

HENRY A. THOMPSON, OF LOOGOOTEE, INDIANA.

NUT-LOCK.

No. 874,642.

Specification of Letters Patent.

Patented Dec. 24, 1907.

Application filed June 3, 1907. Serial No. 377,022.

*To all whom it may concern:*

Be it known that I, HENRY A. THOMPSON, citizen of the United States, residing at Loogootee, in the county of Martin and State of Indiana, have invented certain new and useful Improvements in Nut-Locks, of which the following is a specification.

The present invention relates to certain new and useful improvements in the construction of nut locks, and aims to provide a novel means whereby the nut may be positively locked against working loose.

The invention is especially designed for use in connection with rail joints or similar devices employing a plurality of bolts, and is of that type which comprises a flexible washer member designed to be bent into engagement with the nut after the same has been tightened.

For a full description of the invention and the merits thereof and also to acquire a knowledge of the details of construction and the means for effecting the result, reference is to be had to the following description and accompanying drawings, in which:

Figure 1 is a side elevation showing the invention applied to a rail joint. Fig. 2 is a transverse sectional view through the joint. Fig. 3 is a plan view of the blank comprising the nut locking member.

Corresponding and like parts are referred to in the following description and indicated in all the views of the drawings by the same reference characters.

In general the invention comprises a nut lock which is in the nature of a flexible plate provided with a bolt receiving opening and also with an opening designed to receive the nut and lock the same against rotary movement.

In the preferred form of the invention shown in Fig. 1 the locking member consists of an elongated plate 1 provided along one edge with a plurality of flexible tongues 2 and along its opposite edge with notches 3 designed to engage the spikes or other fastening members employed for securing the rails to the ties. Each of the flexible tongues 2 is provided toward its end with a circular bolt receiving opening 4 and at its base with an angular opening 5 corresponding to the nuts 6. One of these flexible tongues 2 is provided for each of the bolts 7 and when applying the locking member the bolts are passed through the openings 4 in the tongues 2, the said tongues supporting the plate 1 in a position above the bolts. After the nuts 6 have been applied and tightened in the usual manner the plate 1 is swung downwardly so as to double the flexible tongues upon themselves and throw the nuts 6 within the angular openings 5.

As will be clearly apparent from an inspection of Fig. 2 the plate 1 is spaced from the vertical or web portion of the joint and has the lower edge thereof bent outwardly so as to fit against the base of the joint as indicated at 8, the before mentioned notches 3 engaging the spikes 9 whereby the locking member is securely held against accidental displacement. Owing to the fact that the nuts 6 fit accurately within the corresponding angular openings 5 it will be clearly apparent that they will be held rigidly in position and locked against all rotary movement after the plate 1 has been swung downwardly and the tongues 2 doubled upon themselves. However should it be desired for any reason to remove the bolts the desired result can be readily accomplished by disengaging the plate 1 from the spikes 9 and swinging the same upwardly until the openings 5 are moved away from the nuts 6.

Having thus described the invention, what is claimed as new is:

A nut lock for rail joints and the like comprising a locking plate provided along one of its edges with notches and along the opposite edge with a plurality of laterally extending flexible tongues, each of the tongues having a bolt receiving opening formed in its end portion and a nut engaging opening formed adjacent its base, the said locking plate being held in an inverted position when being applied and being bent downwardly to throw the nuts within the before mentioned nut engaging openings after the nuts have been tightened, the locking plate having the notched edge thereof deflected outwardly to extend along the base of the rails and throw the notches into engagement with the spikes.

In testimony whereof I affix my signature in presence of two witnesses.

HENRY A. THOMPSON. [L. S.]

Witnesses:
 THOS. F. FARMER,
 R. B. PATTON.